United States Patent
Simin et al.

(10) Patent No.: US 9,741,802 B2
(45) Date of Patent: Aug. 22, 2017

(54) SEMICONDUCTOR DEVICE WITH BREAKDOWN PREVENTING LAYER

(71) Applicant: Sensor Electronic Technology, Inc., Columbia, SC (US)

(72) Inventors: Grigory Simin, Columbia, SC (US); Michael Shur, Latham, NY (US); Remigijus Gaska, Columbia, SC (US)

(73) Assignee: Sensor Electronic Technology, Inc., Columbia, SC (US)

( * ) Notice: Subject to any disclaimer, the term of this patent is extended or adjusted under 35 U.S.C. 154(b) by 0 days.

(21) Appl. No.: 14/979,915

(22) Filed: Dec. 28, 2015

(65) Prior Publication Data

US 2016/0111505 A1  Apr. 21, 2016

Related U.S. Application Data

(63) Continuation-in-part of application No. 14/942,004, filed on Nov. 16, 2015, which is a continuation of
(Continued)

(51) Int. Cl.
| | |
|---|---|
| *H01L 29/66* | (2006.01) |
| *H01L 29/40* | (2006.01) |
| *G06F 17/50* | (2006.01) |
| *H01L 29/778* | (2006.01) |
| *H01L 29/872* | (2006.01) |
| *H01L 29/20* | (2006.01) |

(52) U.S. Cl.
CPC ........ *H01L 29/408* (2013.01); *G06F 17/5068* (2013.01); *G06F 17/5072* (2013.01); *H01L 29/404* (2013.01); *H01L 29/405* (2013.01); *H01L 29/7786* (2013.01); *H01L 29/872* (2013.01); *G06F 2217/02* (2013.01); *G06F 2217/78* (2013.01); *H01L 29/2003* (2013.01); *H01L 29/402* (2013.01)

(58) Field of Classification Search
CPC .................................................. H01L 29/42364
USPC .................................. 257/343; 438/140, 454
See application file for complete search history.

(56) References Cited

U.S. PATENT DOCUMENTS

| | | |
|---|---|---|
| 5,563,080 A | 10/1996 | Ahn |
| 5,744,841 A | 4/1998 | Gilbert et al. |

(Continued)

OTHER PUBLICATIONS

Chaudhari, C., U.S. Appl. No. 14/942,004, Office Action1, Sep. 2016, 12 pages.
(Continued)

*Primary Examiner* — Chandra Chaudhari
(74) *Attorney, Agent, or Firm* — Labatt, LLC

(57) ABSTRACT

A semiconductor device with a breakdown preventing layer is provided. The breakdown preventing layer can be located in a high-voltage surface region of the device. The breakdown preventing layer can include an insulating film or a low conductive film with conducting elements embedded therein. The conducting elements can be arranged along a lateral length of the insulating film or the low conductive film. The conducting elements can vary in at least one of composition, doping, conductivity, size, thickness, shape, and distance from the device channel along a lateral length of the insulating film or the low conductive film, or in a direction that is perpendicular to the lateral length.

20 Claims, 12 Drawing Sheets

Related U.S. Application Data application No. 14/040,900, filed on Sep. 30, 2013, now Pat. No. 9,190,510.

(60) Provisional application No. 61/707,990, filed on Sep. 30, 2012.

(56) References Cited

U.S. PATENT DOCUMENTS

| | | | |
|---|---|---|---|
| 6,110,804 | A | 8/2000 | Parthasarathy et al. |
| 7,579,631 | B2 * | 8/2009 | Gaun ............... H01L 27/285 |
| | | | 257/106 |
| 8,080,848 | B2 | 12/2011 | Darwish et al. |
| 8,507,984 | B2 | 8/2013 | Kondou |
| 8,803,232 | B2 * | 8/2014 | Huo ............... H01L 29/0696 |
| | | | 257/335 |
| 2001/0048122 | A1 | 12/2001 | Tada et al. |
| 2005/0127373 | A1 | 6/2005 | Yokota et al. |
| 2006/0255377 | A1 | 11/2006 | Tu |
| 2012/0205667 | A1 | 8/2012 | Simin et al. |
| 2013/0056753 | A1 | 3/2013 | Simin et al. |
| 2013/0127521 | A1 | 5/2013 | Simin et al. |

OTHER PUBLICATIONS

Chaudhari, C., U.S. Appl. No. 14/040,900, Notice of Allowance, Jul. 20, 2015, 5 pages.

Chaudhari, C., U.S. Appl. No. 14/040,900, Office Action 1, Mar. 4, 2015, 13 pages.

Choi, International Search Report for PCT/US2013/062540, Jan. 16, 2014, 13 pages.

Feiler et al., Multistep Field Plates for High-Voltage Planar p-n Junctions, IEEE Transactions on Electron Devices, Jun. 1992, pp. 1514-1520, vol. 39 No. 6, IEEE.

Karmalkar et al., Enhancement of Breakdown Voltage in AlGaN/GaN High Electron Mobility Transistors Using a Field Plate, IEEE Transactions on Electron Devices, Aug. 2001, pp. 1515-1521, vol. 48 No. 8, IEEE.

Karmalkar, S.; Shur, M.S.; Simin, G.; Khan, M.A., Field-plate engineering for HFETs, IEEE Trans. on Electron Devices, V. 52, pp. 2534-2540 (2005).

Saito et al., Theoretical limit estimation of lateral wide band-gap semiconductor power-switching device, Solid-State Electronics, 2004, pp. 1555-1562, Elsevier.

Yang, Y., Chinese Application No. 201380061263.7, Office Action (with English translation), Dec. 21, 2016, 18 pages.

Chaudhari, C., U.S. Appl. No. 14/942,004, Final Office Action1, Feb. 22, 2017, 13 pages.

* cited by examiner

US 9,741,802 B2

SEMICONDUCTOR DEVICE WITH BREAKDOWN PREVENTING LAYER

REFERENCE TO RELATED APPLICATIONS

The present patent application is a continuation-in-part application of U.S. application Ser. No. 14/942,004, which was filed on 16 Nov. 2015, and which is a continuation of U.S. application Ser. No. 14/040,900, which was filed on 30 Sep. 2013, and which claims the benefit of U.S. Provisional Application No. 61/707,990, which was filed on 30 Sep. 2012, each of which is hereby incorporated by reference in its entirety to provide continuity of disclosure.

TECHNICAL FIELD

The disclosure relates generally to semiconductor device design, and more particularly, to a solution for increasing an operating voltage and/or a maximum power of a semiconductor device.

BACKGROUND ART

In power semiconductor devices, achieving the highest breakdown voltage simultaneously with minimal on-resistance is one of the most important performance characteristics. Lateral geometry devices, such as field-effect transistors (FETs), including metal oxide semiconductor FETs (MOSFETs), metal semiconductor FETs (MESFETs), high electron mobility transistors (HEMTs), etc., have a channel aligned along the semiconductor surface, and which is often located close to the semiconductor surface. If the space-charge (depletion) region occupies only a portion of the gate-drain spacing, the electric field in that spacing is strongly non-uniform and can result in premature breakdown, which limits the device performance. Due to a high carrier concentration in the channel and the close vicinity of the channel to the semiconductor surface, efficient control over the space charge distribution in the gate-drain spacing is extremely challenging.

FIG. 1A shows a conventional heterostructure FET (HFET) 2A according to the prior art, and FIG. 2 shows an illustrative electric field distribution chart according to the prior art. As illustrated in FIG. 2, the electric field profile in the gate-drain spacing having a distance, $L_{GD}$, shown in FIG. 1A exhibits a strong peak near the gate edge when the HFET 2A is operated as a switch (without a field plate). The peak width is defined by the carrier concentration in the channel. To this extent, a breakdown voltage for the HFET 2A does not increase when the gate-drain spacing distance $L_{GD}$ is increased.

One approach to lower the peak electric field near the gate edge is the use of one or more field-modulating plates (FPs), which can be connected to either the gate, source, or drain electrodes. FIG. 1B shows a conventional heterostructure FET (HFET) 2B including a field plate FP according to the prior art. A multistep field plate structure is shown in FIG. 1C, and a gradual field plate structure is shown in FIG. 1D. As illustrated in FIG. 2, the field plate structure decreases the peak field near the gate electrode edge by splitting it into two peaks, thereby increasing the breakdown voltage for the device. However, even the multiple field plate structures, which split the electric field into even more peaks, cannot achieve a uniform electric field in the device channel.

Additionally, optimal configuration of multiple field plates is difficult to achieve. For example, the optimal configuration requires precisely controlled field plate length and dielectric thickness variation along the channel. In addition, prior art field plates have either source or gate potential applied to them, and therefore, significant voltage exists between the field plate and the drain electrode. As a result, a device including field plate(s) can suffer from premature breakdown between the field plate(s) and the drain electrode. Furthermore, the field plate(s) increases the inter-electrode and electrode-semiconductor capacitances, and therefore, decreases the device maximum operating frequency.

As a result of the above limitations, current high-voltage FET switches (i) do not achieve the breakdown voltages predicted by fundamental material properties and (ii) exhibit breakdown voltage—gate-drain spacing dependence saturating at high voltages, typically four hundred volts and above, which imposes serious limitations on device design for kilovolt switching applications.

SUMMARY OF THE INVENTION

This Summary Of The Invention introduces a selection of certain concepts in a brief form that are further described below in the Detailed Description Of The Invention. It is not intended to exclusively identify key features or essential features of the claimed subject matter set forth in the Claims, nor is it intended as an aid in determining the scope of the claimed subject matter.

Aspects of the invention provide a semiconductor device with a breakdown preventing layer. The breakdown preventing layer can be located in a high-voltage surface region of the device. In one embodiment, the breakdown preventing layer can include an insulating film with conducting elements embedded therein. The conducting elements can be arranged along a lateral length of the insulating film. The conducting elements can be configured to split a high electric field spike otherwise present in the high-voltage surface region during operation of the device into multiple much smaller spikes. In another embodiment, the breakdown preventing layer can comprise a low conductive film with conducting elements embedded therein that can be arranged along a lateral length of the breakdown preventing layer. The conducting elements can vary in one of composition, doping, conductivity, size, thickness, shape, and distance from a device channel, along the lateral length of the breakdown preventing layer or in a direction that is perpendicular to the lateral length.

A first aspect of the invention provides a lateral semiconductor device, comprising: a device channel; a first contact on a first end of the device channel; a second contact on a second end of the device channel opposite the first end thereof, wherein the first and second contacts are located on a first side of the device channel; and a breakdown preventing layer located on the first side of the device channel in at least a portion of a spacing between the first contact and the second contact, wherein the breakdown preventing layer is a continuous layer within the portion of spacing between the first contact and the second contact, the breakdown preventing layer having a top surface free from contact thereover by each of the first contact and the second contact, and side surfaces that are vertically planar with all side surfaces of the first contact and the second contact, and wherein the breakdown preventing layer comprises: an insulating film; and a plurality of conducting elements embedded in the insulating film, wherein the plurality of conducting elements are arranged along a lateral length of the insulating film.

A second aspect of the invention provides method comprising: creating a design for a lateral semiconductor device, wherein the design for the lateral semiconductor device defines a device including: a device channel; a first contact on a first end of the device channel; a second contact on a second end of the device channel, wherein the second end is opposite the first end, and wherein the first and second contacts are located on a first side of the device channel; and a breakdown preventing layer located on the first side of the device channel in at least a portion of a spacing between the first contact and the second contact, wherein the breakdown preventing layer is a continuous layer within the portion of spacing between the first contact and the second contact, the breakdown preventing layer having a top surface free from contact thereover by each of the first contact and the second contact, and side surfaces that are vertically planar with all side surfaces of the first contact and the second contact, and wherein the breakdown preventing layer comprises: an insulating film; and a plurality of conducting elements embedded in the insulating film, wherein the plurality of conducting elements are arranged along a lateral length of the insulating film; and fabricating the lateral semiconductor device according to the design.

A third aspect of the invention provides a lateral semiconductor device, comprising: a device channel; a first contact on a first end of the device channel; a second contact on a second end of the device channel opposite the first end thereof; and a breakdown preventing layer located between the first contact and the second contact, wherein the breakdown preventing layer comprises: a plurality of conducting elements embedded in the breakdown preventing layer, wherein the plurality of conducting elements are arranged along a lateral length of the breakdown preventing layer, wherein at least one of the conducting elements vary in one of composition, doping, conductivity, size, thickness, shape and distance from the device channel.

The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide a semiconductor device with a breakdown preventing layer. The breakdown preventing layer can be located in a high-voltage surface region of the device. In one embodiment, the breakdown preventing layer can include an insulating film with conducting elements embedded therein. The conducting elements can be arranged along a lateral length of the insulating film. The conducting elements can be configured to split a high electric field spike otherwise present in the high-voltage surface region during operation of the device into multiple much smaller spikes. In this manner, an overall electric field present in the high-voltage surface region can be made more uniform, thereby reducing occurrences of premature breakdown, increasing an operating voltage of the device, increasing a maximum power of the device, and/or the like. In another embodiment, the breakdown preventing layer can comprise a low conductive film with conducting elements embedded therein that can be arranged along a lateral length of the breakdown preventing layer. The conducting elements can vary in at least one of composition, doping, conductivity, size, thickness, shape, and distance from the device channel, along the lateral length of the breakdown preventing layer or in a direction that is perpendicular to the lateral length. In this manner, the configuration provides even higher field uniformity as the potential varies linearly along the low-conducting film, and hence, the electric field under the film is constant. As used herein, unless otherwise noted, the term "set" means one or more (i.e., at least one) and the phrase "any solution" means any now known or later developed solution.

Figure 3:
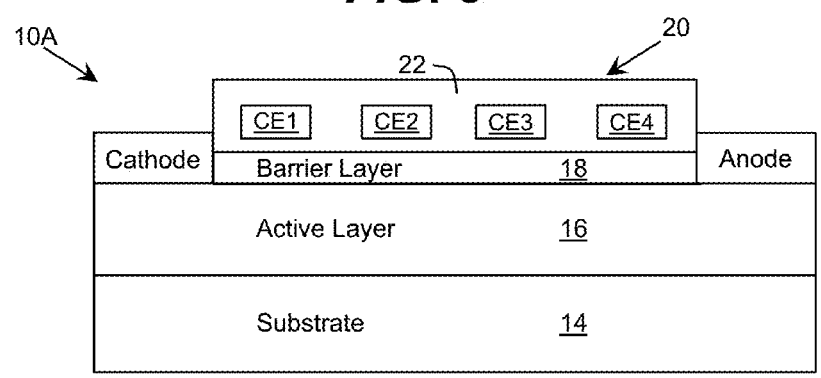
FIG. 3 shows a schematic structure of an illustrative device, which can be operated as a diode, according to an embodiment.
Figure 4:
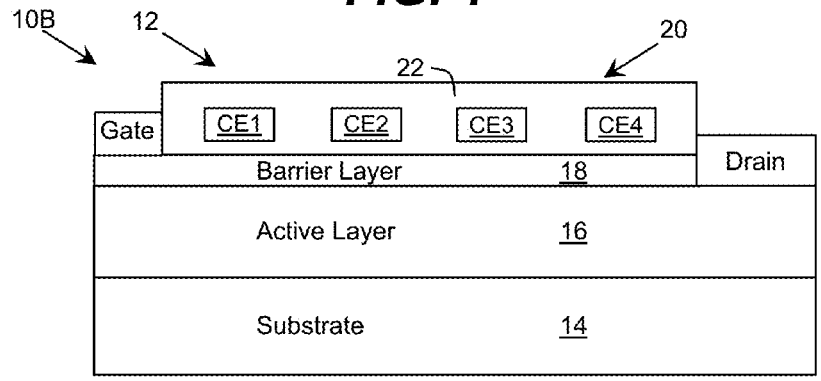
FIG. 4 shows a schematic structure of a gate-drain region of an illustrative device, which can be operated as a field-effect transistor, according to an embodiment.

Turning to the drawings, FIG. 3 shows a schematic structure of an illustrative device 10A, which can be operated as a (planar) diode, according to an embodiment, and FIG. 4 shows a schematic structure of a gate-drain region 12 of an illustrative device 10B, which can be operated as a field-effect transistor, according to an embodiment. Each device 10A, 10B is shown including a substrate 14, an active layer 16, and a barrier layer 18. A channel is formed at a junction of the active layer 16 and the barrier layer 18. In an embodiment, the substrate 14 is formed of silicon carbide (SiC), the active layer 16 is formed of gallium nitride (GaN), and the barrier layer 18 is formed of aluminum gallium nitride (AlGaN). The device 10A is shown including an anode and a cathode, and the device 10B is shown including a gate and a drain. Each of the anode, cathode, gate, and drain are located on a first side of the channel (e.g., above the active layer 16), can be formed of metal, and can form any type of interface to the channel (e.g., Schottky, junction, heterojunction, metal insulator semiconductor, and/or the like).

However, it is understood that this is only illustrative of various possible devices. To this extent, a semiconductor described herein can be formed of any type of semiconductor material. Illustrative semiconductor materials include: silicon (Si), silicon carbide (SiC), germanium (Ge), zinc oxide (ZnO), various types of group III-V or II-VI compound materials, and/or the like. Additionally, a device described herein can be fabricated on a substrate 14 formed of any of various types of compound semiconductor or dielectric materials, including for example: sapphire; diamond; mica; ceramic; Ge; various types of group III nitride substrates including GaN, AlN, BN, AlGaN, AlGaInN, GaBN, AlBN, AlInBN, AlGaBN, and/or the like; $LiGaO_2$; $LiNbO_2$; ZnO; Si; SiC; GaAs; and/or the like. Furthermore, the substrate 14 can comprise a conducting and/or semiconducting substrate.

Similarly, layers 16, 18 can be formed of any combination of various types of group III-V or II-VI compound materials. Illustrative group III-V materials include group III nitride materials, which include one or more group III elements (e.g., boron (B), aluminum (Al), gallium (Ga), and indium (In)) and nitrogen (N), such that $B_W Al_X Ga_Y In_Z N$, where $0 \leq W, X, Y, Z \leq 1$, and $W+X+Y+Z=1$. Illustrative group III nitride materials include AlN, GaN, InN, BN, AlGaN, AlInN, AlBN, GaBN, InGaN, AlGaBN, AlGaInN, AlInBN, and AlGaInBN with any molar fraction of group III elements. Additional illustrative group III-V materials include GaAs, GaAlAs, InGaAs, indium phosphorus (InP), and/or the like.

While not shown for clarity, it is understood that a device 10A, 10B can include various additional contacts (e.g., a source contact for the device 10B) and/or layers (e.g., an initiation layer and/or a buffer layer located between the substrate 14 and the active layer 16). Additionally, one or more of the layers in a heterostructure described herein can include one or more attributes to alleviate strain. For example, a layer can be formed of a superlattice structure. Regardless, each device 10A, 10B, and components thereof, can be manufactured and fabricated using any solution.

Additionally, each device 10A, 10B is shown including a breakdown preventing layer 20. The breakdown preventing layer 20 can be located in a high-voltage surface region of the corresponding device 10A, 10B. In the device 10A, the breakdown preventing layer 20 covers an entirety of the space between the anode and the cathode. In the device 10B, the breakdown preventing layer 20 covers an entirety of the space between the gate and the drain. While not shown, it is understood that a breakdown preventing layer can be located in the space between the gate and a source of a field-effect transistor. While each breakdown preventing layer 20 is shown extending across the entire high-voltage surface region between the corresponding contacts, it is understood that a device can include a breakdown preventing layer located in only a portion of the region. In this case, the breakdown preventing layer may contact only one of the contact or may not contact either of the contacts.

In an embodiment, the breakdown preventing layer 20 comprises a plurality of conducting elements CE1-CE4 embedded (e.g., enclosed) in an insulating film 22. It is understood that while each device 10A, 10B is shown including four conducting elements CE1-CE4, a device can include any number of one or more conducting elements CE1-CE4 embedded in the insulating film 22. When multiple conducting elements CE1-CE4 are included, the conducting elements CE1-CE4 can be spaced uniformly or non-uniformly across a lateral length of the breakdown preventing layer 20 (e.g., within the high-voltage surface region). Regardless, each conducting element CE1-CE4 can be fabricated using any solution and can be formed of any type of conducting/highly-conducting material, such as a metal, a semiconductor, an amorphous solid, a polycrystalline material, and/or the like.

The insulating film 22 can be formed of any type of insulating material. In an embodiment, the insulating film 22 is formed of a layer of a dielectric material, such as silicon dioxide ($SiO_2$), silicon nitride ($Si_3N_4$), hafnium oxide ($HfO_2$), aluminum oxide ($Al_2O_3$), and/or the like. In another embodiment, the insulating film 22 is formed of a layer of a low conducting material, which can help discharge a charge associated with the surface or bulk of the device 10A, 10B and thus reduce/eliminate unwanted dispersion and/or lag in the device 10A, 10B transient and/or high-frequency characteristics. The low conducting material can have a surface resistance that is significantly higher than that of metal electrodes, but is also much lower than that of a dielectric material. For example, the low conducting material can have a sheet resistance between approximately $10^3$ Ohm per square and approximately $10^7$ Ohm per square. Similarly, the low conducting material can have a surface conductivity that is significantly lower than that of metal electrodes, but is also much higher than that of a dielectric material. As a result, the associated characteristic charging-recharging time of the insulating film 22 is much higher than that of metal electrodes and the conducting elements CE1-CE4 embedded therein. Illustrative low conducting materials include, for example: InGaN; a semiconductor; a low conducting dielectric single crystal; a textured, poly-crystalline or amorphous material; a semimetal material; oxides of nickel and other metals, and/or the like.

Figure 5:
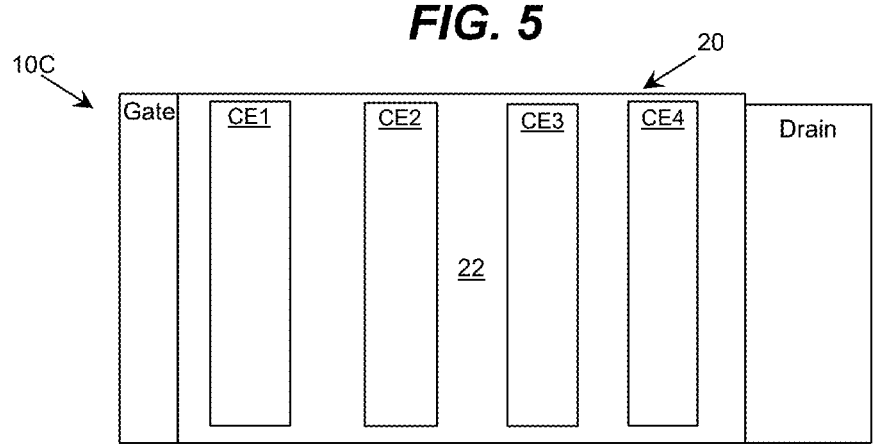
FIG. 5 shows a schematic top view of a gate-drain region of an illustrative device, which can be operated as a field-effect transistor, according to an embodiment.
Figure 6:
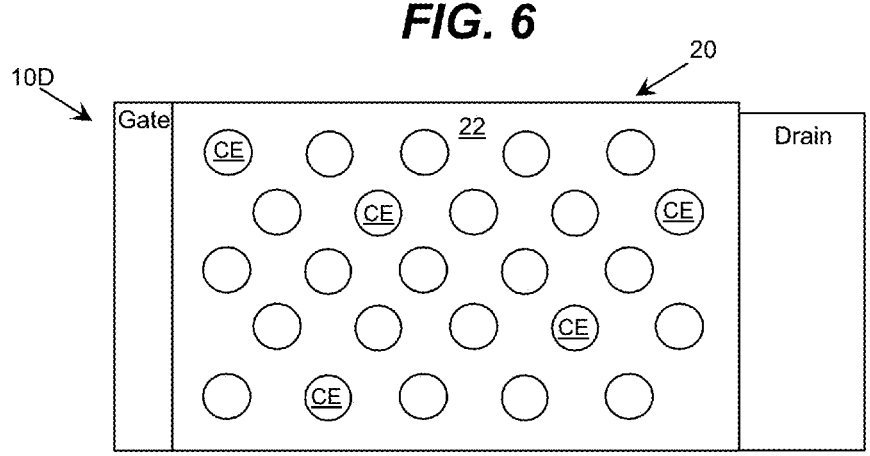
FIG. 6 shows a schematic top view of a gate-drain region of another illustrative device, which can be operated as a field-effect transistor, according to an embodiment.

The conducting elements CE1-CE4 can have any shape and/or location pattern within the corresponding insulating film 22. For example, FIG. 5 shows a schematic top view of a gate-drain region of an illustrative device 10C, which can be operated as a field-effect transistor, according to an embodiment. In this case, each conducting element CE1-CE4 comprises an elongate rectangular (e.g., stripe) shape, which extends along substantially all of a lateral width of the insulating film 22 and has the shorter side aligned with the direction of the surface lateral electrical field lines present during operation of the device 10C. Alternatively, FIG. 6 shows a schematic top view of a gate-drain region of another illustrative device 10D, which can be operated as a field-effect transistor, according to an embodiment. In this case, each conducting element CE comprises an isolated element illustrated as having a spherical shape (e.g., dot). To this extent, each conducting element CE only occupies a relatively small portion of the lateral length and lateral width of the insulating film 22. While the conducting elements CE are shown having spherical shapes, a conducting element CE can have any shape. As illustrated, the conducting elements CE can be periodically located, such as along a hexagonal lattice, in various rows/columns, and/or the like, within the insulating film 22. However, it is understood that this is only illustrative, and the conducting elements CE can be located aperiodically.

Figure 7:
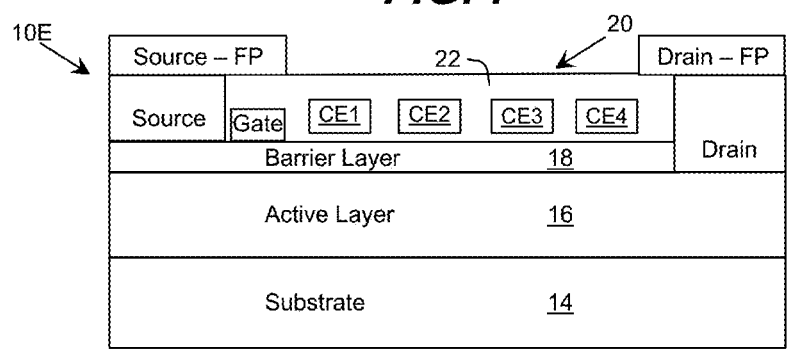
FIG. 7 shows a schematic structure of an illustrative device, which can be operated as a field-effect transistor, according to an embodiment.

Embodiments can provide a device with one or more additional design features to further improve the performance of the device. For example, FIG. 7 shows a schematic structure of an illustrative device 10E, which can be operated as a field-effect transistor, according to an embodiment. In this case, the device 10E is shown including both a drain field plate (Drain—FP) connected to the drain and a source field plate (Source—FP) connected to the source. Each field plate is located on a portion of the insulating film 22. Furthermore, the insulating film 22 is shown extending over the gate and within the gate-source region of the device 10E, thereby covering an entire surface of the device active region. It is understood that while the conducting elements CE1-CE4 are shown only in the gate-drain region of the device 10E, one or more conducting elements can be located within the gate-source region. Alternatively, the conducting elements CE1-CE4 can be located only in the gate-source region. Additionally, it is understood that while the source and the drain are each shown including single field plate, embodiments can include a source and a drain including any number of zero or more field plates (e.g., only a source field plate, only a drain field plate, multiple field plates for the source and/or drain, etc.). Additional design features, which can be included in embodiments include: a multiple gate configuration; a bottom electrode located below the substrate 14; a gate dielectric layer; a heat sink element; and/or the like. Furthermore, embodiments include devices having normally-on channels and devices having normally-off channels.

Figure 8:
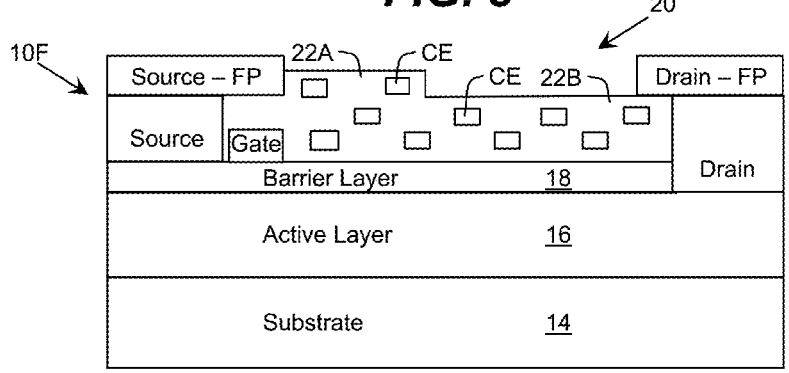
FIG. 8 shows a schematic structure of an illustrative device, which can be operated as a field-effect transistor, according to another embodiment.

Additionally, it is understood that embodiments provide various configurations of the breakdown preventing layer 20. For example, FIG. 8 shows a schematic structure of an illustrative device 10F, which can be operated as a field-effect transistor, according to another embodiment. In this case, the device 10F is shown including a breakdown preventing layer 20 having a non-uniform thickness, which can be configured to further improve a uniformity of the electric field in the high-voltage surface region of the device. In an embodiment, the thickness can be increased in a sub-region of the high-voltage surface region of the device 10F having relatively higher electric field than other sub-region(s) of the high-voltage surface region of the device 10F. For example, the device 10F is shown including a first region 22A of insulating film located near the gate, which has a larger thickness than a second region 22B of the insulating film located near the drain. However, it is understood that this is only illustrative of varying thicknesses that can be implemented on various types of devices (e.g., on a diode, on a device with no field plates, and/or the like).

Additionally, the breakdown preventing layer 20 is shown including a plurality of conducting elements CE arranged in both lateral and vertical directions with respect to a surface of the device 10F between the device electrodes (e.g., the gate and the drain). The arrangement can be aperiodic or periodic (e.g., on a lattice), and can enable an increased density of conducting elements CE as compared to an embodiment in which all of the conducting elements CE are on a single vertical plane. The increased density can further reduce a total length of the regions under the conducting elements CE where the electric field is close to zero, thereby reducing an average electric field present in the high-voltage surface region of the device.

Figure 9:
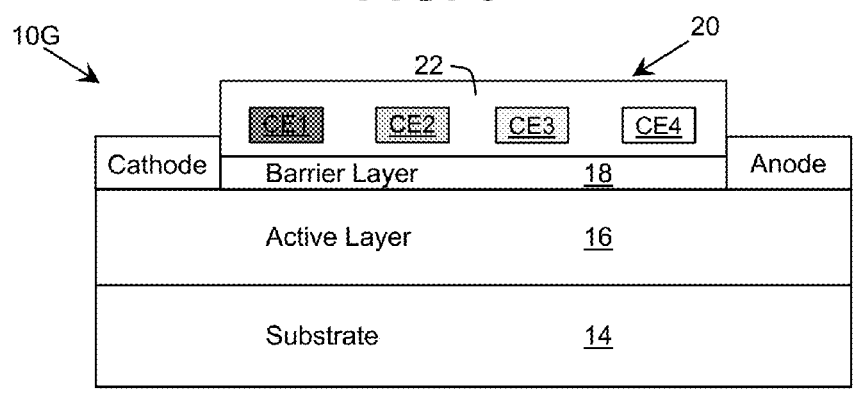
FIG. 9 shows a schematic structure of an illustrative device, which can operate as a diode, having conducting elements with varying conductive properties according to an embodiment.

FIG. 9 shows a schematic structure of an illustrative device 10G that can operate as a diode according to an embodiment. The illustrative device 10G is similar to the device 10A depicted in FIG. 3, except that the conducting elements CE1-CE4 embedded in the insulating film 22 can have varying conductive properties. The varying conductive properties are depicted in FIG. 9 through the various shading applied to the conducting elements CE1-CE4. In one embodiment, the varying conductive properties associated with the conducting elements CE1-CE4 can be due to varying the composition of at least one of the conducting elements at the interface of the elements CE1-CE4 and the underlying insulating film 22. In another embodiment, the varying conductive properties associated with at least one of the conducting elements CE1-CE4 can be due to varying the doping of the conducting elements at the interface of the elements CE1-CE4 and the underlying insulating film 22. In still another embodiment, the varying conductive properties associated with at least one of the conducting elements CE1-CE4 can be due to varying the specific conductivity of the conducting elements at the interface of the elements CE1-CE4 and the underlying insulating film 22.

It is understood that all of the conducting elements CE1-CE4 in the insulating film 22 need not have their conductive properties varied. It may be desirable to only change the conductive properties of only one of the conducting elements CE1-CE4. For example, the conducting element CE3 can include AlInGaN with an appropriate doping and composition to effectuate an overall reduction of the electrical field in the channel of the device. Furthermore, it is understood that various combinations of any of the aforementioned conductive properties can be made for any number of the conducting elements. There is no need to change only one conductive property and to apply that change to all of the conducting elements. In one example, the conducting element CE1 can include highly n-type doped GaN, while conducting element CE2 can include $Al_xGa_{1-x}N$ with lower conductivity than the conducting element CE1 that can be due to, for example, a lower n-type doping. Alternatively, the lower overall conductivity of the conducting CE2 element can be due to a higher specific conductivity at the interface of this element and the insulating film 22.

Figure 10:
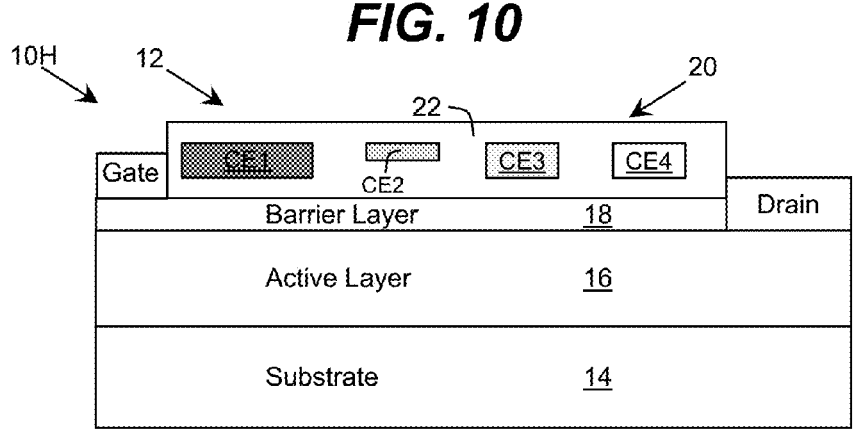
FIG. 10 shows a schematic structure of a gate-drain region of an illustrative device, which can operate as a field-effect transistor, having conducting elements with varying conductive properties according to another embodiment.

FIG. 10 shows a schematic structure of a gate-drain region 12 of an illustrative device 10H that can operate as a field-effect transistor according to an embodiment. The illustrative device 10H is similar to the device 10B depicted in FIG. 4, except that the conducting elements CE1-CE4 embedded in the insulating film 22 can have varying conductive properties. The varying conductive properties are depicted in FIG. 10 through the various shading applied to the conducting elements CE1-CE4. As discussed with regard to the device 10G of FIG. 9, varying the conductive properties of the conducting elements CE1-CE4 can be due to at least one of varying the composition of the conducting elements, varying the doping of the conducting elements, and varying the specific conductivity of the conducting elements. In addition to varying composition, doping and specific conductivity, device 10H illustrates that the size and the thickness of the conducting elements are other parameters that can be changed to attain varying conductive properties at the conducting elements CE1-CE4. For example, in FIG. 10, the conducting elements CE1 and CE2 have different sizes than conducting elements CE3 and CE4, while conducting element CE2 has a different thickness than conducting elements CE1, CE3 and CE4. Although not illustrated in FIG. 10 for purposes of clarity, another parameter that can be changed to attain varying conductive properties at the conducting elements CE1-CE4 is modifying their distance from the channel. In particular, conducting elements that are closer to the channel will result in more pronounced field peaks suppression, while conducting elements that are further away from the channel will result in a lesser effect on the field profile.

Figure 11:
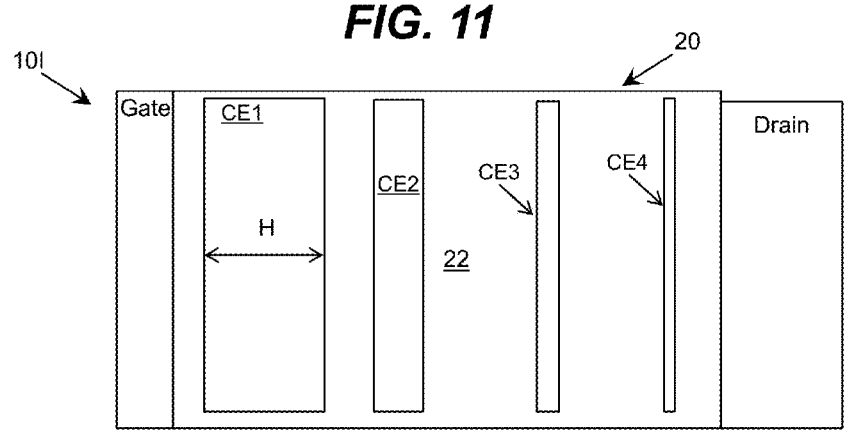
FIG. 11 shows a schematic top view of a gate-drain region of an illustrative device, which can operate as a field-effect transistor, having conducting elements of varying sizes and thicknesses according to an embodiment.

FIG. 11 shows a schematic top view of a gate-drain region of an illustrative device 10I that can operate as a field-effect transistor according to an embodiment. Like the device 10C of FIG. 5, the conducting elements CE1-CE4 can each have an elongated rectangular shape that extends substantially along all of a lateral width of the insulating film 22 with a shorter side aligned with the direction of the surface lateral electrical field lines present during operation of the device 10I. In addition, FIG. 11 shows that the conducting elements CE1-CE4 can vary in size from one element to another element. For example, the conducting elements CE1-CE4 can have variation of widths H from one element to another element. For example, FIG. 11 shows that conducting element CE1 has a greater width H than the widths of conducting elements CE2, CE3 and CE4. It is understood that the widths of the conducting elements CE1-CE4 are only for illustrative purposes and those skilled in the art will appreciate that multiple configurations of the conducting elements CE1-CE4 with varying widths exist. In any event, configuring the conducting elements CE1-CE4 enables additional control of the conductivity of the breakdown preventing layer 20 which permits further improvements in controlling the distribution of the electric field throughout the device 10I.

Figure 12:
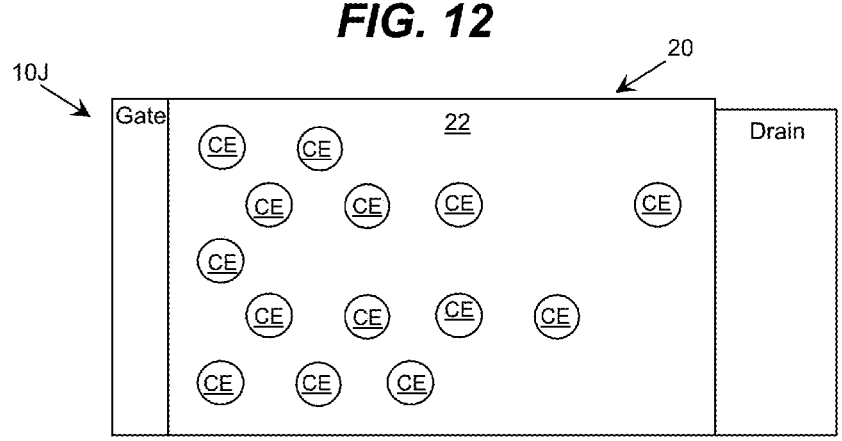
FIG. 12 shows a schematic top view of a gate-drain region of an illustrative device, which can operate as a field-effect transistor, having conducting elements of varying density according to an embodiment.

FIG. 12 shows a schematic top view of a gate-drain region of an illustrative device 10J that can operate as a field-effect transistor according to an embodiment. Like the device 10D of FIG. 6, the conducting elements CE can take the form of isolated elements incorporated within the insulating film of the breakdown preventing layer 20. The conducting elements CE can include all types of shapes including, but not limited to, spherical shapes and cylindrical shapes. As mentioned above, the conducting elements CE can be periodically located within the insulating film of the breakdown preventing layer 20.

In another embodiment, the conducting elements CE can be arranged within the insulating film of the breakdown preventing layer 20 with varying density. In particular, the density of the conducting elements CE can change along the direction from the gate to the drain. For example, as shown in FIG. 12, the density of conductive elements CE can be higher at the gate region than the drain region, which spreads the electrical field along the channel of the device 10J in this manner.

In another embodiment, the breakdown preventing layer 20 can include an underlying layer of non-zero conductivity as opposed to an insulating film. In this manner, the conducting elements CE can be embedded into the non-zero conductivity underlying layer of the breakdown preventing layer 20. In one embodiment, the underlying layer of non-zero conductivity of the breakdown preventing layer 20 can include, for example, a semiconductor element with low doping, while the conductive elements CE can include semiconductor material with higher doping or different composition. In another embodiment, the breakdown preventing layer 20 can include a semiconductor layer, wherein the doping is selected to produce the desired variable conductivity within the semiconductor layer.

Figure 13:
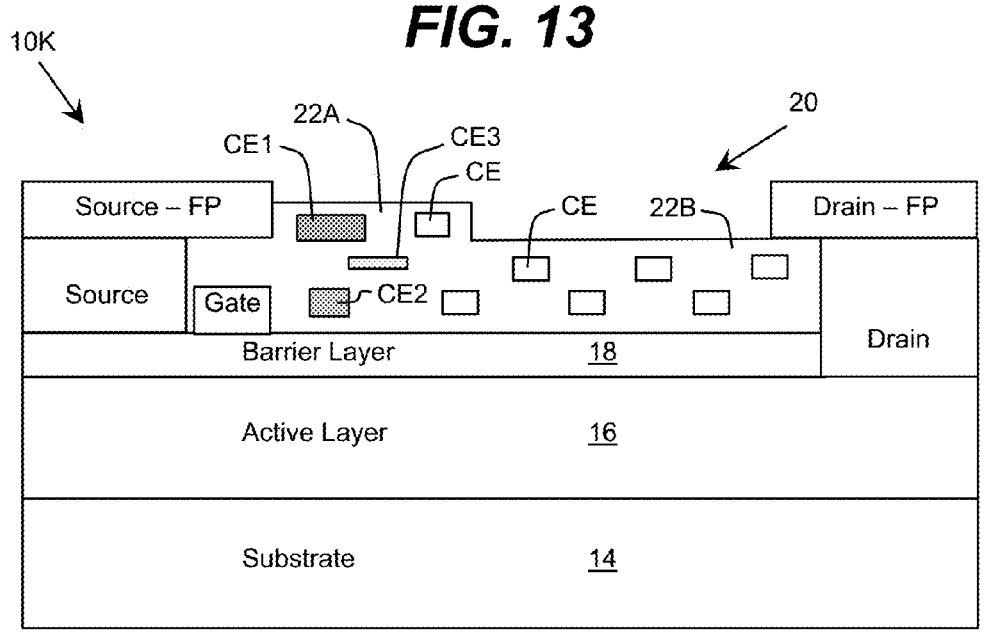
FIG. 13 shows a schematic structure of an illustrative device, which can operate as a field-effect transistor, having conducting elements that can vary in at least one of composition, doping, conductivity, size, thickness, shape, and distance from the device channel to attain varying conductive properties according to an embodiment.

FIG. 13 shows a schematic structure of an illustrative device 10K that can operate as a field-effect transistor according to an embodiment. Like the device 10F of FIG. 8, the device 10K can have a breakdown preventing layer 20 with a non-uniform thickness that is helpful in improving the uniformity of the electric field in the high-voltage surface of the device. For example, the insulating film of the device 10K can have a first region 22A located near the gate with a thickness that is larger than the thickness of a second region 22B that is near the drain. The varying thicknesses of the insulating film depicted in FIG. 13 is only illustrative of one possible configuration and it is understood that other possibilities exist. Similarly, even though this varying thickness configuration is illustrated with respect to a field-effect transistor it is understood that this concept is suitable for other types of devices such as, for example, a diode, and a transistor without any field plates (FP).

FIG. 13 further shows that the conducting elements CE are embedded in both varying thickness regions 22A and 22B of the insulating film 22 within the breakdown preventing layer 20. In particular, the conducting elements CE can be arranged in both lateral and vertical directions with respect to a surface of the device 10K between the device electrodes (e.g., the gate and the drain). In one embodiment, the arrangement of conducting elements CE can be aperiodic or periodic and can enable an increased density of conducting elements. As shown in FIG. 13, the region 22A of the insulating film can have an increased density of conducting elements, while the region 22B near the drain can have the conducting elements arranged to be spread out and less densely arranged.

The conducting elements CE of the device 10K arranged in the insulating film of the breakdown preventing layer 20 can vary in composition, doping, conductivity, shape, size, thickness and distance from the channel to attain varying conductive properties in the aforementioned manner. It is understood that all of the conducting elements CE1-CE4 in the insulating film 22 need not have their conductive properties varied. It may be desirable to only change the conductive properties of only one of the conducting elements CE1-CE4. For example, the conducting element CE3 can include AlInGaN of appropriate doping and composition to effectuate an overall reduction of the electrical field in the channel of the device. Furthermore, it is understood that various combinations of any of the aforementioned conductive properties can be made for any number of the conducting elements. There is no need to change only one conductive property and to apply that change to all of the conducting elements. In one example, the conducting element CE1 can include highly n-type doped GaN, while conducting element CE2 can include $Al_xGa_{1-x}N$ with lower conductivity than the conducting element CE1 that can be due to, for example, a lower n-type doping. Alternatively, lower overall conductivity of the conducting CE2 element can be due to higher specific conductivity at the interface of this element and the insulating film 22. In another example, conducting element CE3 can include AlInGaN of appropriate doping and composition to result in overall reducing of electrical field in the channel of the device 10K.

Also, some of the conducting elements CE can be arranged to have different sizes and thicknesses. For example, conducting elements CE1-CE3 in the region 22A of the insulating film can have different sizes, shapes and thicknesses in comparison to the other conducting elements. These changes in sizes, shapes and thicknesses can be the only changes implemented for these conducting elements, or the changes can supplement any additional changes made to the elements including, but not limited to, the composition, doping, conductivity, distance from the channel, in order to attain a suitable conductive property characteristic. It is understood that the arrangement of the conducting elements CE and the parameters that can be varied to attain certain conductive properties as described with respect to FIG. 13 is only illustrative of some possible configurations and those skilled in the art will appreciate that there are numerous other possibilities.

Figure 14:
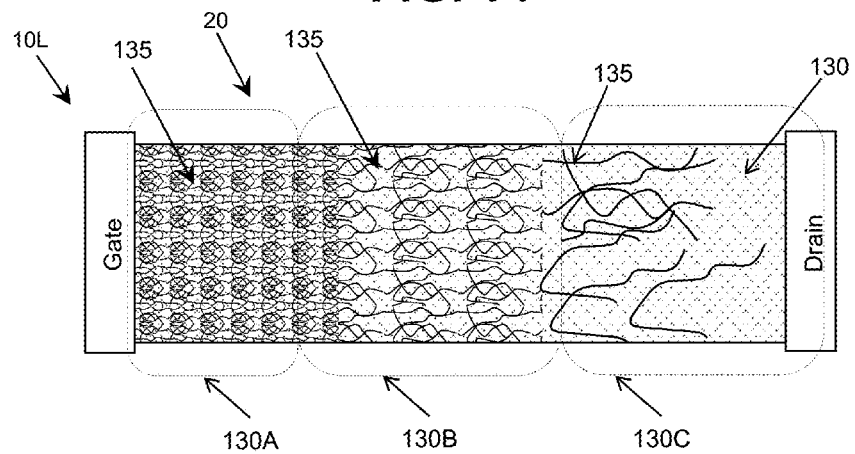
FIG. 14 shows schematic top view of a structure of a gate-drain region of an illustrative device, which can operate as a field-effect transistor, having a low conductive film with conducting elements embedded therein according to an embodiment.

FIG. 14 shows a schematic top view of a structure of a gate-drain region of an illustrative device 10L that can operate as a field-effect transistor according to an embodiment. In this embodiment, the breakdown preventing layer 20 includes a low conductive film 130 with conducting elements 135 embedded therein. As used herein, a low conductive film or material is a material that would typically have a sheet resistance between approximately $1 \times 10^3$ Ohms per square and approximately $1 \times 10^7$ Ohms per square. Examples of materials that are suitable for use as the low conductive film 130 can include, but are not limited to, glass containing silver particles, other embedded metal particles, various semiconductor materials such as poly-silicon, amorphous silicon, low-doped materials of groups IV or AlIIBV, conducting dielectric films, and/or the like.

In one embodiment, the conducting elements 135 embedded in the low conductive film 130 can include highly conductive elements. As used herein, a highly conductive element is a material with a sheet resistance at least two orders of magnitude lower than that of a low-conducting material used in the corresponding embodiment. A non-exhaustive list of highly conductive elements that are suitable for use as the conducting elements 135 can include, but are not limited to, carbon nanotubes, metal thin films, highly-doped semiconductors, and/or the like.

As shown in FIG. 14, the low conductive film 130 can be segmented into regions of varying density in which the conducting elements 135 are embedded. In one embodiment, the low conductive film 130 can include a high density region 130A, a middle density region 130B and a lower density region 130C. A high density region 130A of conducting elements 135 generally has an element size and spacing that are close to or smaller than the electric field peak. As a result, a high density region will have typical density values of conducting elements 135 in the range of about 2 to about 5 elements per μm, while a middle density region of conducting elements 135 will generally have typical density values in the range of about 1 to about 5 elements per 5 μm, and a lower density region of conducting elements 135 will generally have typical density values in the range of about 1 to about 5 elements per 20 μm.

In FIG. 14, the high density region 130A has more conducting elements arranged therein than the middle density region 130B which has more conducting elements than the lower density region 130C. It is understood that the example of regions associated with the low conductive film 130 of the device 10L is illustrative one possible segmentation of the conductive film. For example, the low conductive film can have more or less regions than that depicted in FIG. 14. Furthermore, it is understood that the segmentation of regions that decrease in density is not meant to be limiting. For example, the regions of the low conductive film can be segmented in an increasing order of density or in a random arrangement of density.

In one embodiment, the higher density region 130A of conducting elements 135 within the low conductive film 130 can include a sufficient density of conducting elements to form a percolated network structure. As used herein, a percolated network structure of conducting elements is a random arrangement of conducting elements with the density providing at least one full conducting path along the entire network due to some conducting elements being in direct electric contact with the other conducting elements. In one embodiment, the percolated network structure of conducting elements in the higher density region 130A of the low conducting film 130 can yield a highly conductive layer. As used herein, a highly conductive layer has a sheet resistance at least two orders lower than that of a low-conducting or dielectric film used in the embodiment, wherein a low-conducting film would typically have a sheet resistance in the range from about $10^3$ Ohm per square to about $10^7$ Ohm per square.

In one embodiment, the middle density region 130B and the lower density region 130C of the low conductive film 130 may not form a percolated network structure due to having a lower density of conducting elements 135 than the higher density region 130A. However, it is understood, that it is possible to have more than one region of the low conductive film that forms a percolated network structure, and even all of the regions can form a percolated network structure if desired. The density of the conducting elements in each region will have a role in determining the suitability for forming a percolated network therein.

In one embodiment, the lower density region 130C of conducting elements 135 can be configured to yield a low conductivity. As noted above, a low conductivity has a sheet resistance in the range from about $10^3$ Ohm per square to about $10^7$ Ohm per square. In one embodiment, the lower density region 130C of the low conductive film 130 can include a layer of low conductivity. Examples of a low conductivity layer suitable for use in the lower density region 130C can include, but are not limited to, a platinum sphere and alumina, other embedded metal particles, and embedded semiconductor materials such as silicon, materials of groups IV or AlIIBV and the like.

In another embodiment, the low conductive film 130 can include a composite film having a matrix layer with the conducting elements formed therein. The size and density of the conducting elements 135 in the matrix layer can be selected to yield an overall low conductivity of the composite film. In one embodiment, the matrix of the composite film can be segmented into varying degrees of density in which the conducting elements are arranged. For example, the matrix can be segmented into a higher density region or regions of conducting elements. These higher density regions of conducting elements can further be arranged to form a percolated network structure.

Figure 15:
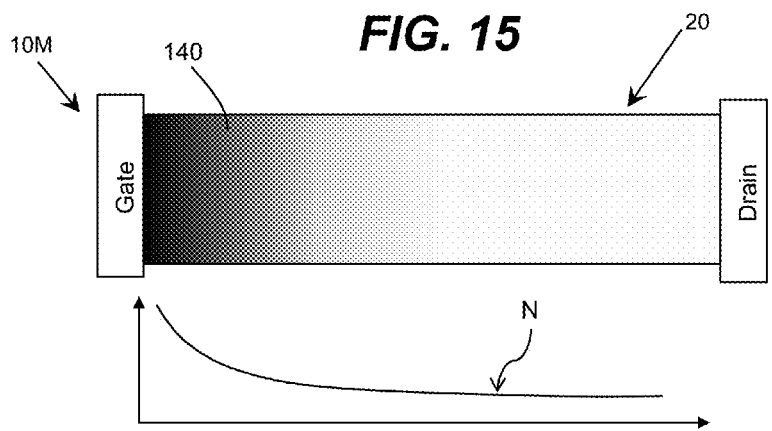
FIG. 15 shows a schematic top view of a structure of a gate-drain region of an illustrative device, which can operate as a field-effect transistor, having varying doping according to an embodiment.

FIG. 15 shows a schematic top view of a structure of a gate-drain region of an illustrative device 10M that can operate as a field-effect transistor. In this embodiment, the breakdown preventing layer 20 includes a low conductive film 140 with low doping. As used herein, low doping means a semiconductor material having a combination of dopants and deep centers and/or structural or compositional defects resulting in a sheet resistance ranging from about $10^3$ Ohm per square to about $10^7$ Ohm per square. In one embodiment, the low conductive film 140 with low doping can include a semiconductor with low doping. Examples of a semiconductor with low doping that can form the low conductive film 140 can include, but are not limited to, semiconductor materials such as poly-silicon, amorphous silicon, compensated silicon, low-doped and compensated materials of groups IV or AlIIBV and the like.

FIG. 15 further shows that the low conductive film 140 of the device 10M can have a doping that varies in magnitude along a direction from the gate to the drain and/or in a direction that is perpendicular to a line extending from the gate to the drain. The amount of doping in the low conductive film 140 of the device 10M is depicted by the shading applied to the low conductive film. For example, the darker the shading can be an indication that there is more doping, while the lighter shading can be an indication that there is less doping. As shown in FIG. 15, regions of the low conductive film 140 near the gate can have higher doping, while regions near the drain can have lower doping. In one embodiment, the darker region of the low conductive film 140 near the gate can comprise a high n-type doping, while the lighter regions near the drain can include lower doping. In one embodiment, the low conductive film 140 can have a variable doping that changes smoothly from the gate to the drain. For example, FIG. 15 includes a graphical representation of the doping characteristics N of the low conductive film 140 that includes a smooth, variable doping between the gate and the drain. In particular, the doping characteristics N of the low conductive film vary smoothly along the direction from the gate to the drain, resulting in variable, smooth monotonic changes in conductivity of the film. In this manner, the low conductive film 140 can have variable conductivity between the gate and the drain. In one embodiment, the doping of the low conductive film 140 can vary to yield a sheet resistance that can range from about $10^3$ Ohm per square near the gate to about $10^7$ Ohm per square in the low conductive region near the drain. In general, the low conductive film 140 should have a low conductivity and support a current that is not significantly higher than the current of the device during an off state.

In another embodiment, the low conductive film 140 can include conducting elements embedded therein. For example, any of the aforementioned highly conducting elements can be incorporated within the low conductive film. In this manner, the device 10M can be arranged to have similar features as discussed with regard to FIG. 14. For example, the low conductive film 140 of the device 10M can be configured to have segmented regions of conducting elements that are arranged to have varying density in how the elements are situated therein. In one embodiment, the low conductive film 140 of the device 10M can have some regions that have sufficient density of the placement of the conducting elements that enable percolated network structures of highly conductive elements to be formed.

Figure 16A:
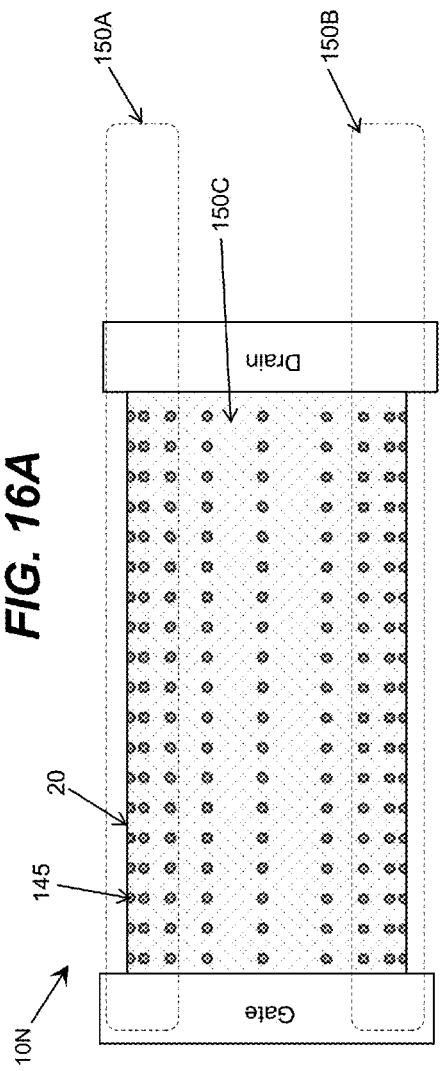
FIGS. 16A-16C show schematic structures of a gate-drain region of illustrative devices, which can operate as field-effect transistors, having a low conductive film with conducting elements embedded therein with varying conductivity properties according to embodiments.
Figure 16C:
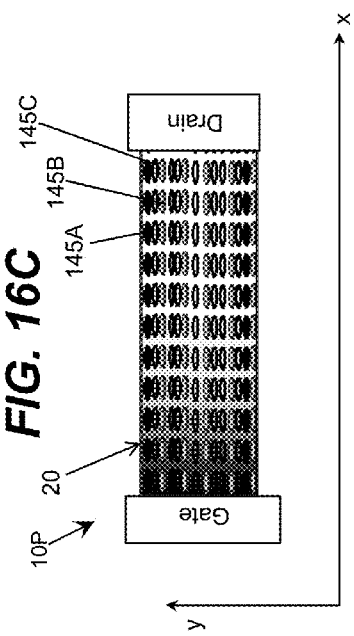
Figure 16B:
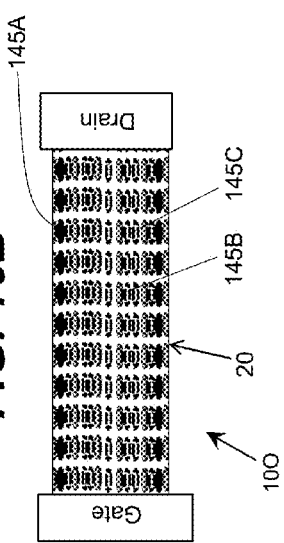

FIGS. 16A-16C show schematic structures of a gate-drain region of illustrative devices, which can operate as field-effect transistors, having a low conductive film with conducting elements embedded therein with varying conductivity properties according to an embodiment. In particular, the devices of FIGS. 16A-16C can have conducting elements 145 that vary along the width of the devices. In this manner, the breakdown preventing layer 20 associated with each device can have different conductive properties at different regions of the layer. For example, the device 10N of FIG. 16A illustrates that the breakdown preventing layer 20 can have different conductive properties at the side of the device as compared to the conductive properties in the middle section of the device. As shown in FIG. 16A, the sides of the breakdown preventing layer 20 can have a higher concentration of conducting elements 145, while a middle portion of the breakdown preventing layer can have a lower concentration of conducting elements. The higher concentration of conducting elements 145 that are closely packed at the sides of the device 10M form higher conductive regions 150A and 150B, while the lower concentration of conductive elements 145 in the middle of the breakdown preventing layer 20 form a lower conductive region 151B. In this manner, only a part of the breakdown preventing layer 20 is highly conductive (i.e., the sides). It is understood that the entire breakdown prevention layer 20 should have a conductivity that results in an overall current drawn through the layer that is not higher than the current drawn through the device in an off state. Furthermore, it is understood that the conductivity of the breakdown prevention layer 20 can be varied to account for the surface effects at the front and back sides of the device 10N.

The conducting elements 145 in FIGS. 16A-16C can be embedded in the breakdown preventing layer 20 in an arrangement that is along a lateral length of the breakdown preventing layer, such that at least one of the conducting elements vary in one of composition, doping, conductivity, size, thickness, shape and distance from the channel. In one embodiment, the varying of these conductivity properties can occur within the breakdown preventing layer 20 in a direction extending from the gate to the drain. In another embodiment, the varying of these conductivity properties can occur within the breakdown preventing layer 20 in a direction that is perpendicular to a line extending from the gate to the drain. The conductive properties such as the composition, doping, conductivity, size, thickness, shape and distance from the channel of the conducting elements 145 within the breakdown preventing layer 20 can be varied in the aforementioned approaches. Also, the breakdown preventing layer 20 can include a low conductive film with the conducting elements 145 embedded therein that can have different composition and doping than the underlying breakdown preventing layer. In another embodiment, the breakdown preventing layer 20 can include a low conductive composite film having a matrix layer with metallic conducting elements 145 embedded into the matrix layer.

FIG. 16B shows a device 10O with a breakdown preventing layer 20 according to one embodiment. For example, the device 10O can include conducting elements that can have different composition, doping, or material. The different composition, doping, or different material of the conducting elements 145 are represented by shading applied to each element. For example, one shading can represent composition, while another shading can represent doping, while another shading can represent material. It is also understood that the various shadings can represent the variation for one particular conductive property. For example, the shading can represent the material of the conducting elements. In one embodiment, the conducting element 145A can represent metallic elements, the conducting elements 145B can represent semiconductor elements, while the conducting elements 145C can represent very low conducting elements (e.g., insulating elements).

FIG. 16C shows a device 10P with conducting elements 145 that incorporates the features of FIG. 16B in which the conducting elements can have different composition, doping, or material along with the features of FIG. 15 in which the breakdown preventing layer 20 can include a low conductive film with low doping. In this manner, the device 10P can be arranged to have variable conductivity in both lateral directions as designated by directions x and y in the x-y graph accompanying FIG. 16C. It is understood that without the x-y graph the conductivity of the device 10P can be otherwise stated to have variable conductivity in a direction extending from the gate to the drain, and in a direction that is perpendicular to a line extending from the gate to the drain.

Figure 17:
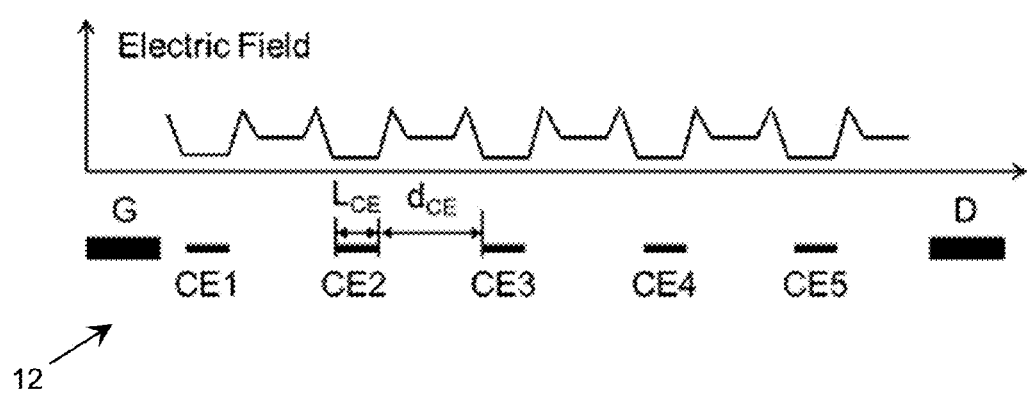
FIG. 17 shows an illustrative electric field distribution in a gate-drain region of a field-effect transistor according to an embodiment.

When implemented in a circuit, the conducting elements described herein can have a floating potential. The presence of the conducting elements embedded in an insulating layer as described herein can significantly reduce a peak electric field in a high-voltage region of a lateral device of any type (e.g., diode, field-effect transistor, and/or the like) during operation of the device within the circuit. FIG. 17 shows an illustrative electric field distribution in a gate-drain region 12 of a field-effect transistor according to an embodiment. In this case, the gate-drain region 12 includes five conducting elements CE1-CE5, which are embedded in an insulating layer (not shown) between the gate and the drain of the corresponding device. As illustrated, an electric field under each of the conducting elements CE1-CE5 is very low, e.g., two to three times lower than the peak field at the conducting element edge. Additionally, each conducting element CE1-CE5 generates two electric field spikes (fringing fields) at its edges.

Figure 1A:
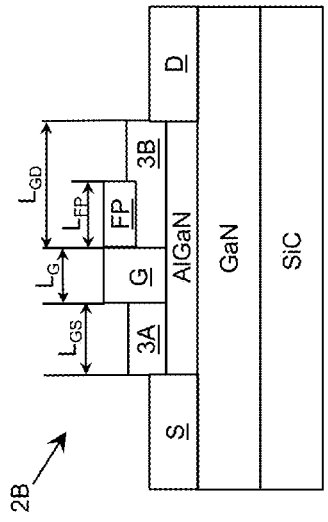
FIGS. 1A-1D show conventional field effect transistors according to the prior art.
Figure 1B:
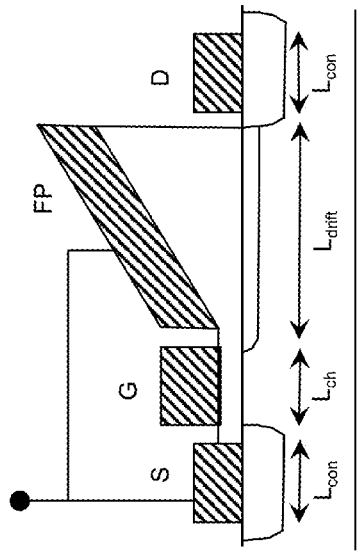
Figure 1C:
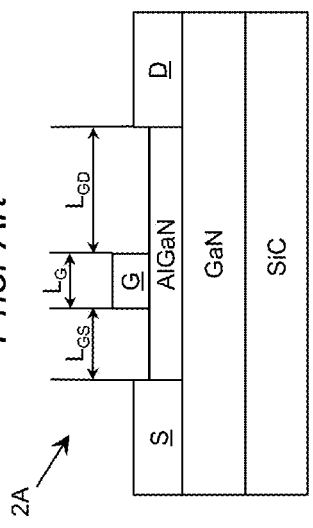
Figure 1D:
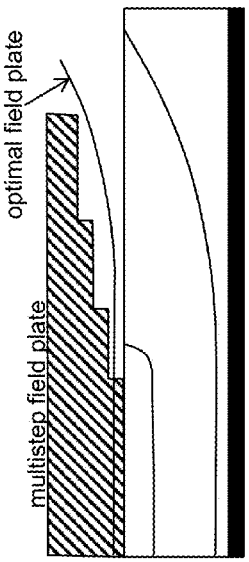
Figure 2:
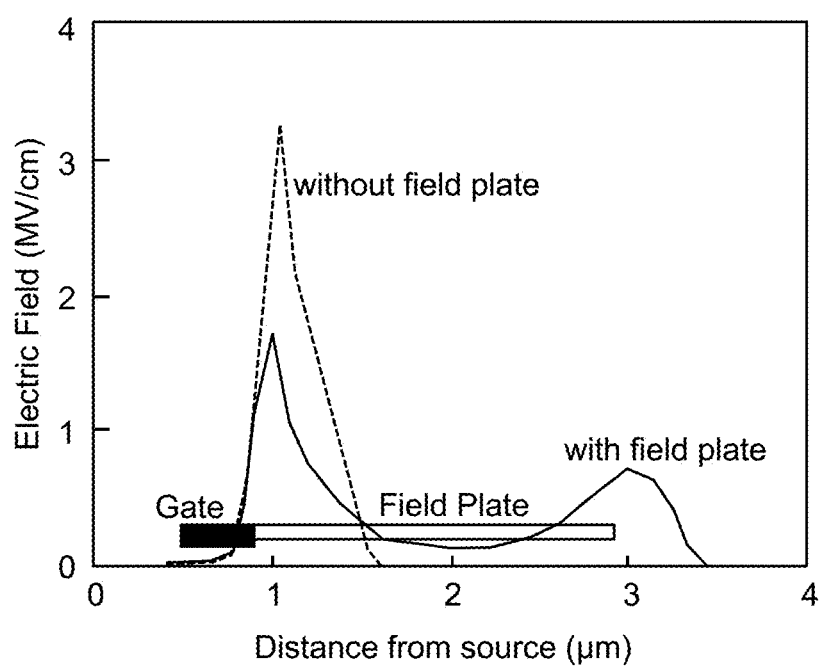
FIG. 2 shows an illustrative electric field distribution chart according to the prior art.

A breakdown preventing layer described herein is electrostatically coupled to the channel of the device. During operation of the device, the breakdown preventing layer induces a lateral electric field in the channel and at a surface of the device to be close to that in the breakdown preventing layer. As the electric field within each highly conducting element is very low, the electric field in the breakdown preventing layer is comprised mainly of the fringing electric fields at the edges of each of the conducting elements CE1-CE5, as shown in FIG. 17, and a gradually increasing electric field in the spacing between the conducting elements CE1-CE5. In an embodiment, the spacing between the conducting elements CE1-CE5 is selected so that the electric field in the spacing between the conducting elements CE1-CE5 remains quasi-uniform. The breakdown preventing layer splits high electric field spikes at the gate/drain edges (e.g., as shown in FIG. 2) into a large number of much smaller spikes with nearly uniform electric fields in between (e.g., as shown in FIG. 17). As a result, an overall electric field is more uniform than that of the prior art devices. The more uniform electric field can reduce instances of premature breakdown of the device. Furthermore, the conducting elements CE1-CE5 in the breakdown preventing layer can provide surface compensating charges, and therefore reduce device dependence on the surface conditions.

In an embodiment, a minimal lateral spacing between conducting elements in a breakdown preventing layer is defined by a characteristic size of the lateral edge field spike. The characteristic size of the edge field spike can be obtained by solving the electrostatic field distribution for the particular device. For a typical AlGaN/GaN heterostructure with a barrier layer 18 (FIG. 3) having a thickness of approximately twenty nanometers, an estimate of the lateral electric field spread around the edge, $\Delta E_{FR}$, is approximately 0.3 μm. Assuming a conducting element spacing, $d_{CE}$, being close to the fringing field spread ($d_{CE} \approx \Delta E_{FR}$), a maximum electric field in the high-field region (e.g., the gate-to-drain spacing 12) can be calculated as:

$$E_M = \frac{2V}{Nd_{CE}} \quad (1)$$

where V is the voltage across the high-field region (e.g., gate-drain voltage, reverse voltage across a diode, and/or the like), and N is the number of conducting elements in the high-field region. For a value of N=1, equation (1) provides an approximate expression for the peak electric field in a device including an optimally configured field plate. As illustrated, in a device with a high number of conducting elements as described herein, the peak electric field is significantly reduced from that present for a device including the optimally configured field plate. For example, for N=5, the peak electric field is five times lower than that of a device with an optimally configured field plate.

A separation between the conducting elements and the device surface channel can be defined by a vertical fringing field spread, $\Delta E_{FRV}$, which can be estimated using any solution. In an embodiment, the conducting element-surface distance, $d_V$, can be approximately equal to the vertical fringing field spread, e.g., $d_V \approx \Delta E_{FRV}$. For a typical AlGaN/GaN heterostructure, $d_V \approx \Delta E_{FRV} \approx 0.2$ to 0.7 μm. Correspondingly, a thickness of the insulating film in which the conducting elements are embedded, $d_{BPC}$, can be approximately two to four times the conducting element-surface distance, e.g., $d_{BPC} \geq (2-4) \times d_V$. In an embodiment, a vertical spacing between conducting elements arranged vertically (e.g., as shown in FIG. 8) does not exceed $d_V$. A minimal vertical spacing is limited by the technology used. For example, the vertical spacing can be selected to avoid short circuits between the elements, and typically should not be less than a few nanometers.

In an embodiment, a length of the each conducting element, $L_{CE}$, is selected to be as small as obtainable by the device fabrication process. In this case, a total length of the regions under the conducting elements with very low electric fields is reduced/minimized, which results in the average electric field being reduced/minimized. In an illustrative embodiment, the lateral length of each conducting element is less than half the distance between conducting elements. In another illustrative embodiment, the lateral length of each conducting element is an order of magnitude smaller than the lateral distance between conducting elements, e.g., $L_{CE} = (0.1-0.5) \times d_{CE}$.

As described herein, the conducting elements can be formed from metal or any other conducting material. In an embodiment, the material is selected to meet a requirement that the electric field distribution near the conducting element follows quasi-instantly a voltage change across the device. To meet this requirement, a characteristic RC constant given by a product of the lateral resistance of the conducting element and a capacitance between the conducting element and the channel is smaller (e.g., 3-10 times smaller) than a period corresponding to an operating frequency of the device.

Fabrication of a device having a schematic structure described herein can be performed using any solution. Although any number of conducting elements can be utilized, a significant peak field reduction can be achieved with three or more conducting elements. In an embodiment, the number of conducting elements located within a region is selected based on the lateral length of the corresponding region, the lateral length of each conducting element, and a target spacing between the conducting elements.

Aspects of the invention are shown and described primarily with reference to a heterostructure field-effect transistor and diode. However, it is understood that aspects of the invention can be implemented in various types of field-effect transistors, including, for example, a field-effect transistor, a heterostructure field-effect transistor, an insulated gate field-effect transistor, an insulated gate heterostructure field-effect transistor, a multiple heterostructure field-effect transistor, a multiple heterostructure insulated gate field-effect transistor, an inverted field-effect transistor, an inverted heterostructure field-effect transistor, an inverted insulated gate field-effect transistor, an inverted insulated gate heterostructure field-effect transistor, an inverted multiple heterostructure field-effect transistor, an inverted insulated gate multiple heterostructure field-effect transistor, and/or the like. Additionally, as described herein, aspects of the invention can be implemented in other types of semiconductor devices, including for example, a diode of any type (e.g., a pn-diode, a pin-diode, a heterojunction diode, a metal insulator semiconductor diode, and/or the like), a semiconductor resistor, a semiconductor sensor, a light emitting diode, a laser, an integrated element, and/or the like.

Figure 18:
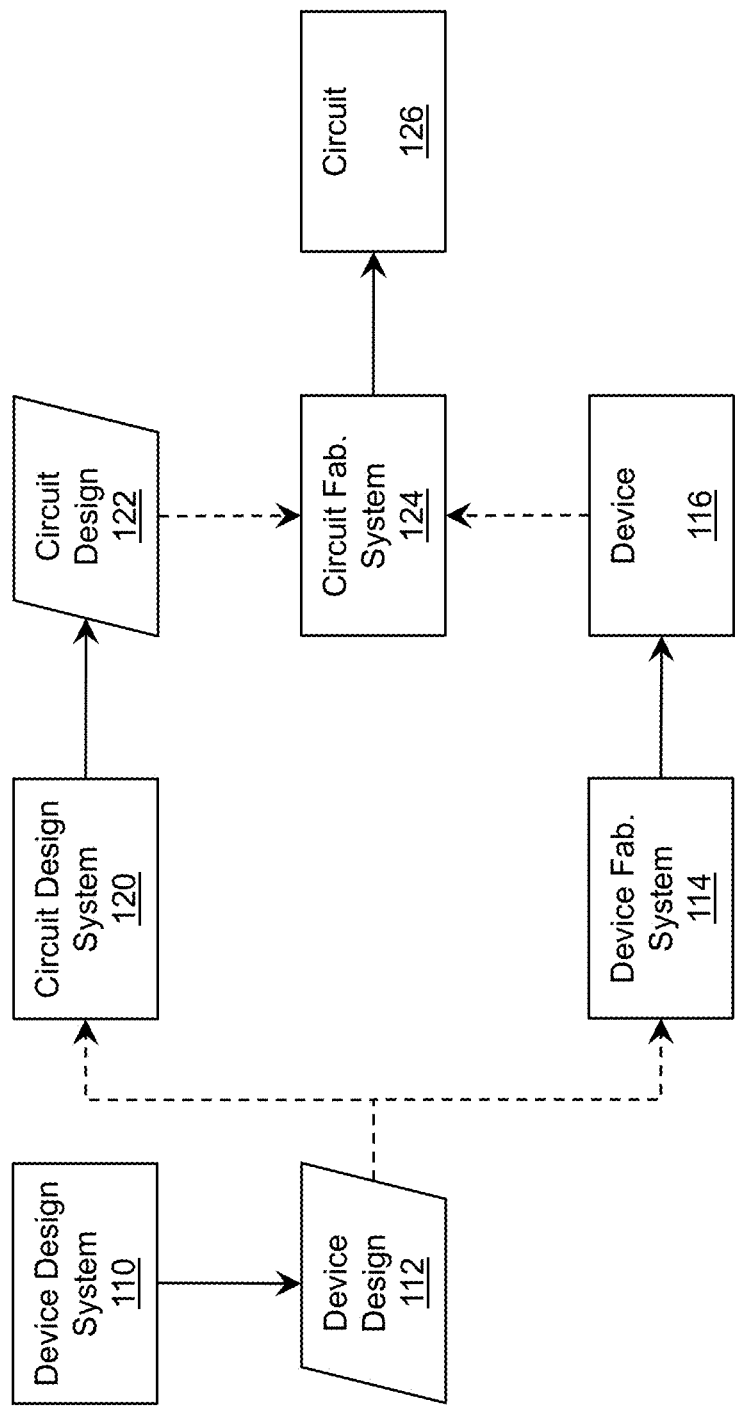
FIG. 18 shows an illustrative flow diagram for fabricating a circuit according to an embodiment.

In an embodiment, the invention provides a method of designing and/or fabricating a circuit that includes one or more of the devices designed and fabricated as described herein. To this extent, FIG. 18 shows an illustrative flow diagram for fabricating a circuit 126 according to an embodiment. Initially, a user can utilize a device design system 110 to generate a device design 112 for a semiconductor device as described herein. The device design 112 can comprise program code, which can be used by a device fabrication system 114 to generate a set of physical devices 116 according to the features defined by the device design 112. Similarly, the device design 112 can be provided to a circuit design system 120 (e.g., as an available component for use in circuits), which a user can utilize to generate a circuit design 122 (e.g., by connecting one or more inputs and outputs to various devices included in a circuit). The circuit design 122 can comprise program code that includes a device designed as described herein. In any event, the circuit design 122 and/or one or more physical devices 116 can be provided to a circuit fabrication system 124, which can generate a physical circuit 126 according to the circuit design 122. The physical circuit 126 can include one or more devices 116 designed as described herein.

In another embodiment, the invention provides a device design system 110 for designing and/or a device fabrication system 114 for fabricating a semiconductor device 116 as described herein. In this case, the system 110, 114 can comprise a general purpose computing device, which is programmed to implement a method of designing and/or fabricating the semiconductor device 116 as described herein. Similarly, an embodiment of the invention provides a circuit design system 120 for designing and/or a circuit fabrication system 124 for fabricating a circuit 126 that includes at least one device 116 designed and/or fabricated as described herein. In this case, the system 120, 124 can comprise a general purpose computing device, which is programmed to implement a method of designing and/or fabricating the circuit 126 including at least one semiconductor device 116 as described herein.

In still another embodiment, the invention provides a computer program fixed in at least one computer-readable medium, which when executed, enables a computer system to implement a method of designing and/or fabricating a semiconductor device as described herein. For example, the computer program can enable the device design system 110 to generate the device design 112 as described herein. To this extent, the computer-readable medium includes program code, which implements some or all of a process described herein when executed by the computer system. It is understood that the term "computer-readable medium" comprises one or more of any type of tangible medium of expression, now known or later developed, from which a stored copy of the program code can be perceived, reproduced, or otherwise communicated by a computing device.

In another embodiment, the invention provides a method of providing a copy of program code, which implements some or all of a process described herein when executed by a computer system. In this case, a computer system can process a copy of the program code to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a device design system 110 for designing and/or a device fabrication system 114 for fabricating a semiconductor device as described herein. In this case, a computer system can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A lateral semiconductor device comprising:
   a device channel;
   a first contact on a first end of the device channel;
   a second contact on a second end of the device channel opposite the first end thereof, wherein the first and second contacts are located on a first side of the device channel; and
   a breakdown preventing layer located on the first side of the device channel in at least a portion of a spacing between the first contact and the second contact, wherein the breakdown preventing layer is a continuous layer within the portion of spacing between the first contact and the second contact, the breakdown preventing layer having a top surface free from contact thereover by each of the first contact and the second contact, and side surfaces that are vertically planar with all side surfaces of the first contact and the second contact, and wherein the breakdown preventing layer comprises:
an insulating film; and
a plurality of conducting elements embedded in the insulating film, wherein the plurality of conducting elements are arranged along a lateral length of the insulating film.

2. The lateral semiconductor device of claim 1, wherein the insulating film contacts a portion of only one vertical side of each of the first contact and the second contact.

3. The lateral semiconductor device of claim 1, wherein the insulating film completely contacts one vertical side of the first contact and contacts a portion of only one vertical side of the second contact.

4. The lateral semiconductor device of claim 1, further comprising a gate located between the first contact and the second contact, wherein the breakdown preventing layer is located in a region between the gate and the first contact and in a region between the gate and the second contact, wherein the gate has a bottom surface co-linear to a bottom surface of the first contact.

5. The lateral semiconductor device of claim 1, wherein the plurality of conducting elements are embedded non-uniformly in the insulating film between the first contact and the second contact.

6. The lateral semiconductor device of claim 1, wherein the insulating film has a non-uniform vertical thickness, wherein a first region within the insulating film has a vertical thickness that is greater than a vertical thickness of a second region within the insulating film, wherein the plurality of conducting elements are embedded non-uniformly within the vertical thicknesses of each of the first region and the second region of the insulating film.

7. The lateral semiconductor device of claim 1, further comprising a field plate coupled to at least one of the first contact or the second contact, wherein the field plate completely contacts a horizontal surface of at least one of the first contact or the second contact.

8. A method, comprising:
creating a design for a lateral semiconductor device, wherein the design for the lateral semiconductor device defines a device including:
a device channel;
a first contact on a first end of the device channel;
a second contact on a second end of the device channel, wherein the second end is opposite the first end, and wherein the first and second contacts are located on a first side of the device channel; and
a breakdown preventing layer located on the first side of the device channel in at least a portion of a spacing between the first contact and the second contact, wherein the breakdown preventing layer is a continuous layer within the portion of spacing between the first contact and the second contact, the breakdown preventing layer having a top surface free from contact thereover by each of the first contact and the second contact, and side surfaces that are vertically planar with all side surfaces of the first contact and the second contact, and wherein the breakdown preventing layer comprises:
an insulating film; and
a plurality of conducting elements embedded in the insulating film, wherein the plurality of conducting elements are arranged along a lateral length of the insulating film; and
fabricating the lateral semiconductor device according to the design.

9. A lateral semiconductor device, comprising:
a device channel;
a first contact on a first end of the device channel;
a second contact on a second end of the device channel opposite the first end thereof; and
a breakdown preventing layer located between the first contact and the second contact, wherein the breakdown preventing layer is a continuous layer having a top surface free from contact thereover by each of the first contact and the second contact, and side surfaces that are vertically planar with all side surfaces of the first contact and the second contact, and wherein the breakdown preventing layer comprises:
a plurality of conducting elements embedded in the breakdown preventing layer, wherein the plurality of conducting elements are arranged along a lateral length of the breakdown preventing layer, wherein at least one of the conducting elements vary in one of composition, doping, conductivity, size, thickness, shape and distance from the device channel.

10. The lateral semiconductor device of claim 9, wherein the breakdown preventing layer comprises an insulating film, wherein the plurality of conducting elements are embedded in the insulating film.

11. The lateral semiconductor device of claim 9, wherein the breakdown preventing layer comprises a low conductive film, wherein the plurality of conducting elements are embedded in the low conductive film.

12. The lateral semiconductor device of claim 11, wherein the low conductive film comprises a semiconductor with low doping.

13. The lateral semiconductor device of claim 12, wherein the doping of the low conductive film varies in magnitude along a direction from the first contact to the second contact.

14. The lateral semiconductor device of claim 12, wherein the doping of the low conductive film varies in magnitude in a direction that is perpendicular to a line extending from the first contact to the second contact.

15. The lateral semiconductor device of claim 11, wherein the low conductive film comprises a composite film having a matrix layer with the plurality of conducting elements embedded therein, wherein a size and a density of the conducting elements are selected to yield overall low conductivity of the composite film.

16. The lateral semiconductor device of claim 15, wherein the plurality of conducting elements form a percolated network structure.

17. The lateral semiconductor device of claim 11, wherein the plurality of conducting elements vary in density throughout the low conductive film, wherein at least one region of the low conductive film forms a percolated network structure of highly conducting elements.

18. The lateral semiconductor device of claim 11, wherein the plurality of conducting elements vary in conductivity throughout the low conductive film.

19. The lateral semiconductor device of claim 9, wherein the plurality of conducting elements vary in at least one of composition, doping, conductivity, size, thickness, shape, and distance from the device channel within the breakdown preventing layer in a direction extending from the first contact to the second contact.

20. The lateral semiconductor device of claim 9, wherein the plurality of conducting vary in at least one of composition, doping, conductivity, size, thickness, shape and distance from the device channel within the breakdown preventing layer in a direction that is perpendicular to a line extending from the first contact to the second contact.

* * * * *